No. 627,467. Patented June 27, 1899.
J. H. AUBLE.
MECHANISM FOR TRANSMITTING POWER.
(Application filed Mar. 14, 1898.)

(No Model.) 2 Sheets—Sheet 1.

Witnesses.

Inventor.
James H. Auble
per Wm. Hubbell Fisher,
Attorney.

THE NORRIS PETERS CO., PHOTO-LITHO., WASHINGTON, D. C.

No. 627,467. Patented June 27, 1899.
J. H. AUBLE.
MECHANISM FOR TRANSMITTING POWER.
(Application filed Mar. 14, 1898.)
(No Model.) 2 Sheets—Sheet 2.

Witnesses. Inventor.
James H. Auble
per Wm. Hubbell Fisher,
Attorney.

UNITED STATES PATENT OFFICE.

JAMES H. AUBLE, OF DENT, OHIO, ASSIGNOR OF ONE-HALF TO JOSEPH SCHNEIDER, OF LAWRENCEBURG, INDIANA.

MECHANISM FOR TRANSMITTING POWER.

SPECIFICATION forming part of Letters Patent No. 627,467, dated June 27, 1899.

Application filed March 14, 1898. Serial No. 673,683. (No model.)

*To all whom it may concern:*

Be it known that I, JAMES H. AUBLE, a citizen of the United States, and a resident of the town of Dent, in the county of Hamilton and State of Ohio, have invented certain new and useful Improvements in Mechanism for Transmitting Power, of which the following is a specification.

The several features of my invention and the various advantages resulting from their use conjointly or otherwise will be apparent from the following description and claims.

Figure 2:
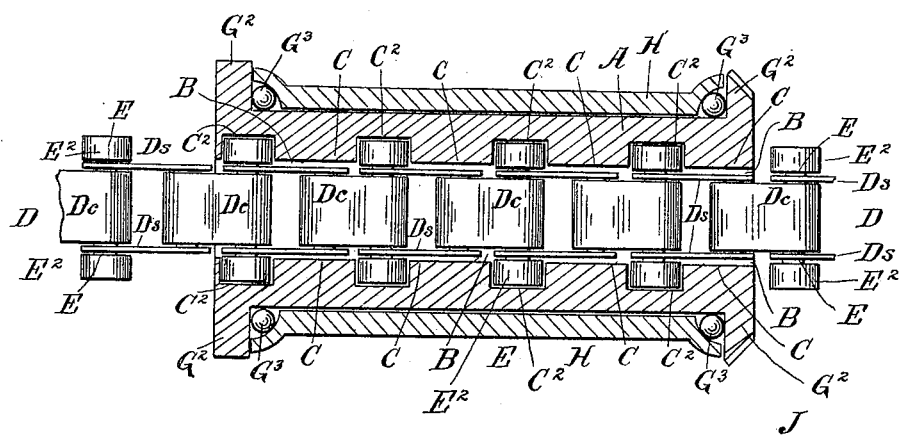
Figure 1:
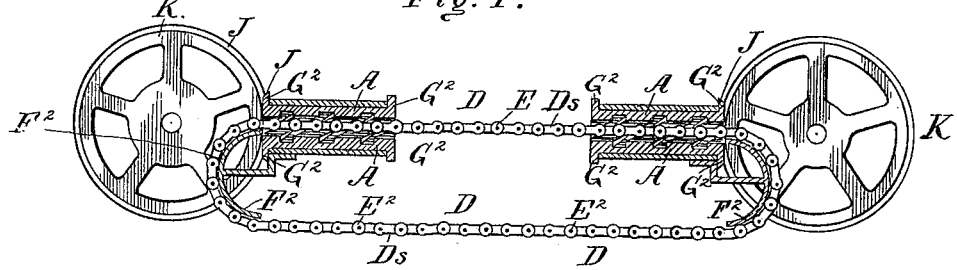
Figure 7:
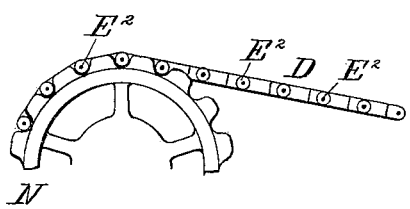
Figure 6:
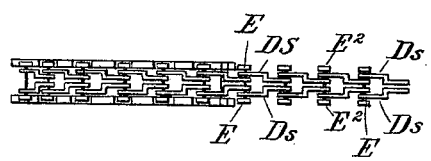
Figure 3:
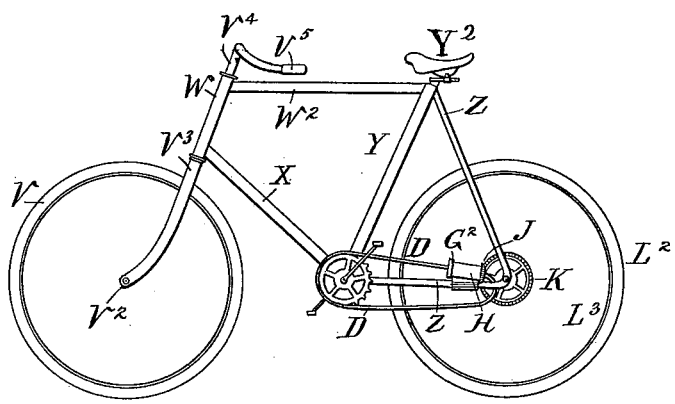
Figure 4:
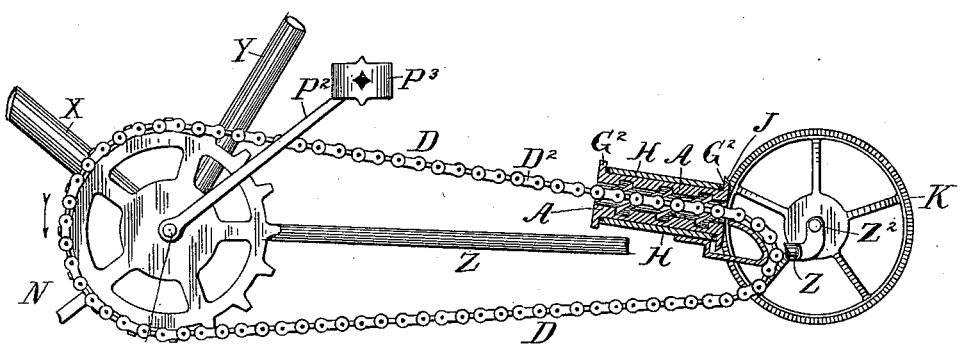
Figure 5:
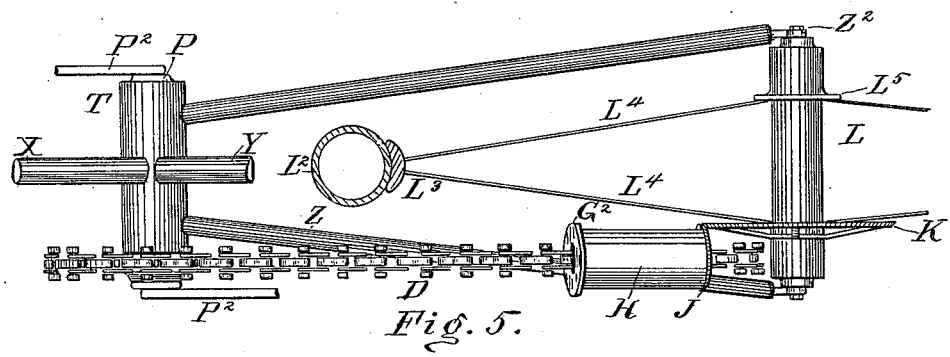

In the accompanying drawings, making a part of this specification, and in which similar letters of reference indicate corresponding parts, Figure 1 is a view, partly in elevation and partly in section, of certain principal features of my invention. Herein the screw-threaded rotatable bodies and the gear they carry and the bearings which carry these rotatable bodies and allow the latter to rotate therein are shown in vertical central section. Fig. 2 is a central horizontal section of one of the screw-threaded bodies and of its bearing, these parts being provided with ball-bearings at each end, the balls and the peculiar sprocket-chain of my invention being shown in elevation. Figs. 3, 4, and 5, Sheet 2, are views of certain features of my invention applied in one manner to a bicycle. Of these figures, Fig. 3 represents a diagrammatic side elevation of a bicycle with certain features of my invention applied thereto. Fig. 4 is in general an enlarged view of my invention and of those parts of the bicycle immediately connected therewith; but the screw-threaded body, its gear and bearing, and the guide for the sprocket-chain are shown in central vertical section. Fig. 5 is a top view of the mechanism as enlarged and essentially similar to that shown in Fig. 4; but no part of my invention is herein shown in section. Fig. 6, Sheet 1, illustrates in plan a modified construction of my new sprocket-chain and its application to a sprocket-wheel. Fig. 7, Sheet 1, illustrates in side elevation the same parts and the same construction shown in Fig. 6.

In the female-screw-threaded body heretofore invented by me and described in and covered by United States Letters Patent No. 594,511, dated November 30, 1897, and granted to me, there was only a single groove forming adjacently a screw-thread therein, and on the sprocket-chain therefor the lateral projections which entered such spiral groove and engaged the female thread alternated on each side. In the present invention the passage B, through the female-screw-threaded body A, is surrounded by two spiral grooves $C^2$, forming two parallel screw-threads C C, and the pitch of these two screw-threads is such that the threads are directly opposite one another at all places in the body A. The lateral projections E on the sprocket-chain do not alternate on each side of the chain, but are present simultaneously on both sides of the chain at the ends of a common axis at right angles to the length of the chain. These lateral projections E are each provided, for the sake of diminishing the friction, with rollers $E^2$ and the latter bear against the sides of the female thread of body A as the latter rotates and the sprocket-chain moves. The links of the sprocket-chain may be variously constructed. For example, the chain, as shown in Figs. 1, 2, 4, and 5, may be termed a "double-linked" one, inasmuch as there is one link D*c*, carrying at one end the lateral projections and at the other duly pivoted to adjacent ends of the side links D*s*. The other ends of the latter are duly pivoted to the pivot or axle which carries rollers $E^2$. Thus by a repetition of such links the chain is formed. The chain may, so far as the link connection is concerned, be variously constructed. For example, in Figs. 6 and 7 another construction of the chain is shown, viz: The side-link pieces D*s*, at a point between adjacent axles or pivots of the rollers $E^2$, approach each other, and thus forming a central body, which may be integral or continue separate, are pivoted to the adjacent axle between the next side-link pieces. In this style of construction there occurs no pivotal connection between the lateral projections E of the chain, while in the construction of the chain shown in Figs. 1, 2, 4, and 5 there is an intermediate pivotal connection. Where a sprocket-chain B is used in connection with the chain in front of or behind the screw-threaded body, the wheel will be constructed to properly engage the chain.

By constructing the body A with two parallel screw-threads and the chain with lateral projections at the same axle I secure much greater symmetrical balance in the mutual operation of the screw-threaded body A and the chain. Heretofore when the lateral projections alternated and during the operation of the rotating body A and the moving chain the latter was subjected to a twisting strain of more or less intensity, according to the amount of work to be performed, and this strain did not operate equally on opposite sides of the chain in a plane through the axis of a given projection. By my present construction of the body A and the chain D, I am enabled the better to make the strain on both sides of the chain equal. Having substantially equalized such a torsional strain, I diminish the wear of the parts, lengthen the life of the mechanism, and at the same time enable the device to perform its work more smoothly and efficiently. In Fig. 1 I have shown two of these screw-threaded bodies A, each preferably carrying the double screw-thread and engaging the lateral projections of a chain, which projections are preferably arranged at opposite ends of the same axle, as heretofore described. Each of these threaded bodies is located in its own bearing H and is rotatable therein. These bearings are stationary and are held in place by suitable connection, which latter constitute no part of my present invention and are therefore omitted from this specification. Flanges $G^2$ on the ends of the threaded bodies or fairly equivalent devices prevent them from slipping longitudinally out of their respective bearings.

At those ends of the cylinders which are farthest away from each other are guides $F^2$ for the better directing the chain D in connection with its movements in relation to the threaded bodies. These guides may be fastened to the bearings, as shown in Figs. 1 and 4.

In connection with those annular flanges of each threaded body which are farthest away from each other are beveled gears J, each concentric with the threaded body to which it is connected. Each of these beveled gears meshes with a beveled pinion or wheel K adjacent to it. Such a construction and combination will often be advisable and much preferable over a sprocket-wheel to drive one of the threaded bodies A. It will be understood that I employ one of the threaded bodies A to positively drive the other threaded body through the intermediate means of the sprocket-chain hereinbefore described. For example, suppose the left-hand gear J to be positively driven from the source of power. This gear in rotating will forcibly rotate the adjacent threaded body A, and the latter will draw the chain D and compel the other (right hand) threaded body to rotate. The latter in turn will rotate the adjacent beveled gear-wheel K for whatever proper purpose desired. On the one hand great force can be transmitted by such a combination, and on the other hand great speed (in exchange for force) can be obtained, it being understood the diameter of one or more of the beveled gears herein involved can be changed as desired.

It will be understood that the direction in which the power comes may be reversed when desired—namely, the power be first directly communicated to the right-hand beveled gearwheel and therefrom be transmitted through the described combination to the left-hand beveled gear J. The operations heretofore described will be reversed; but being readily understood from what I have already specified no further mention of the same is deemed necessary.

In Sheet 2 I have illustrated one mode of applying certain features of my invention to the propulsion of a bicycle. The hub is at its ends connected to the rear ends of horizontal rods Z, substantially as shown. The front ends of these rods Z are fixed to the sleeve T. The frame-rod X connects the sleeve rigidly with sleeve-bearing W, and the frame-rod Y connects this sleeve T with the seat $Y^2$, while an upper horizontal frame bearing-piece $W^2$ connects the seat-support with sleeve-bearing W. This structure may be varied within all reasonable limits permissible with the proper application of my invention thereto and its combination therewith. In the hollow sleeve T is a shaft P, rotatable therein, and using this sleeve as a journal-bearing. The ends of the shaft P project beyond the bearing and are respectively connected in a rigid manner to the ends of the cranks $P^2$. Each of the latter, at its free extremity, carries a pedal $P^3$, suitably pivoted thereto. On the shaft P and fixed thereto between one of the pedal-cranks and the bearing T is a sprocket-wheel N, concentric with said shaft. Geared to this sprocket-wheel is an endless chain D, substantially such as aforedescribed. Fixed concentrically to the rear axle $Z^2$ is a beveled gear K. One of my rotatable screw-threaded bodies A is located near said axle and is supported in a bearing H, substantially such as has been hereinbefore described. This bearing is suitably supported, preferably by one of the frame-pieces Z, the bearing being clamped thereto. The body A has the flanges $G^2$ to prevent it from sliding out of the bearing, and is further provided with the bevel-gear J, the latter engaging the bevel gear-wheel K. A guide $F^2$ is present for assisting the chain to be properly led up to the threaded body, so as to enter the latter in a plane of its axis. This guide is suitably supported—as, for instance, by the bearing H, to which it may be attached.

In operation the sprocket-wheel is rotated in the direction of the arrow, and the chain is forcibly drawn through the threaded body and rotates the latter with power. The threaded body, through the agency of the beveled teeth J, turns the gear-wheel K and hub L. The latter rotates the bicycle-wheel $L^2 L^3 L^4 L^5$, and thus the bicycle-wheel is propelled forward. The pitch of the threads of the threaded body is such as to cause it and its bevel-gear J to rotate at one revolution of the sprocket-wheel N some four times as often as the bevel-gear J if such sprocket-wheel were substituted for the bevel-gear J. Consequently the machine will run four times faster. It will be understood that the relative sizes of the wheel K and the gear J and the diameter of the sprocket-wheel N, as well as the pitch of the threaded body, may be changed as desired for one or more of the following desideratums—viz., economy of power or compactness or speed.

My invention is obviously applicable to the operation of various devices and different mechanisms. Certain features of it are very useful where the traction or movement of certain structures and things is desired—as, for example, in the opening or closing of awnings, &c.

For the purpose of reducing friction I provide a friction-reducing device, which may with benefit be employed in connection with the rotatable screw-threaded body and its bearing. To this end I locate upon the screw-threaded body near each end thereof and in conjunction with the flanges $G^2$ of said body an annular roll of ball-bearing balls $G^3$. In operation the longitudinal thrust of the screw-threaded body against its bearing H is very great, and the ball-bearings $G^3$ will reduce the friction which would otherwise be present between the bearing H and the flanges $G^2$ of the body A.

What I claim as new and of my invention, and desire to secure by Letters Patent, is—

1. The combination of the rotatable body having two female screw-threads parallel to each other, end flanges, gear, a stationary sleeve between the flanges, and a sprocket-chain provided with lateral extensions for engaging these threads, substantially as and for the purposes specified.

2. The combination of the rotatable body having two female screw-threads parallel to each other, and a sprocket-chain provided with lateral extensions at the ends of the same axis, for engaging these threads, and subjecting the chain to an equal strain, substantially as and for the purposes specified.

3. The combination of two rotatable bodies interiorly screw-threaded, and a sprocket-chain having lateral extensions for engaging said female screw of each body, substantially as and for the purposes specified.

4. The combination of two rotatable bodies each interiorly provided with two parallel female screw-threads and the sprocket-chain having lateral extensions, substantially in the same planes, the latter at right angles to the length of the chain, substantially as and for the purposes specified.

5. The combination of two rotatable bodies each having two female screws parallel, and gears for engaging gears, and sprocket-chains with lateral extensions for engaging the grooves, substantially as and for the purposes specified.

6. The combination of the two rotatable bodies each having two female screws parallel and each provided with bevel-gear, and the bevel gear-wheels K, respectively engaging the gear of the bodies, and a sprocket-chain having lateral extensions and connections and engaging the rotatable bodies, substantially as and for the purposes specified.

7. The combination of a rotatable body having two female screw parallel threads, and a sprocket-chain having lateral extensions in the plane of a common axis at right angles to the length of the chain, substantially as and for the purposes specified.

8. In a vehicle, the combination of the pedals, shaft turned thereby, sprocket-wheel rotatable by said shaft, a rotatable body having two parallel female screw-threads and an endless sprocket-chain having lateral projections for engaging such threads, a stationary bearing for the threaded body, a gear for rotating the wheel of the vehicle, and a gear on the threaded body for engaging this last-named gear, substantially as and for the purposes specified.

9. In combination with one or more rotatable bodies having double or parallel female screw-threads, a sprocket-chain having the central links, in turn connected at one end to side links and at the other end pivoted to axes, the latter carrying at their ends projections for engaging the female screws, the side links being likewise pivoted to said axes, substantially as and for the purposes specified.

10. The combination of a rotatable female-screw-threaded body, having lateral projections, and a sprocket-chain having lateral projections for engaging the female screw of the body, and a bearing in which the screw-threaded body rotates, and ball-bearings at each end of the bearing and between it and the rotatable body and its lateral projections, substantially as and for the purposes specified.

JAMES H. AUBLE.

Attest:
WM. E. JONES,
K. SMITH.